United States Patent
Shi et al.

(10) Patent No.: US 10,111,285 B2
(45) Date of Patent: Oct. 23, 2018

(54) ADAPTIVE TURN-OFF DELAY TIME COMPENSATION FOR LED CONTROLLER

(71) Applicant: Texas Instruments Incorporated, Dallas, TX (US)

(72) Inventors: Minwen Shi, Shanghai (CN); Ruochen Zhang, Shanghai (CN); Qingjie Ma, Shanghai (CN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/587,992

(22) Filed: May 5, 2017

(65) Prior Publication Data
US 2018/0192487 A1    Jul. 5, 2018

Related U.S. Application Data

(63) Continuation of application No. PCT/CN2016/112870, filed on Dec. 29, 2016.

(51) Int. Cl.
*H05B 37/02* (2006.01)
*H05B 33/08* (2006.01)

(52) U.S. Cl.
CPC ....... *H05B 33/0815* (2013.01); *H05B 33/083* (2013.01); *H05B 33/0845* (2013.01)

(58) Field of Classification Search
CPC .............. H05B 33/0815; H05B 33/083; H05B 33/0845
See application file for complete search history.

(56) References Cited

U.S. PATENT DOCUMENTS

| 8,339,067 B2 * | 12/2012 | Lin | H05B 33/0818 315/291 |
| 8,867,240 B2 * | 10/2014 | Gaknoki | H02M 1/4258 363/21.17 |
| 2003/0034853 A1 * | 2/2003 | Chou | H02M 1/36 332/109 |

(Continued)

FOREIGN PATENT DOCUMENTS

| CN | 102573222 A | 7/2012 |
| CN | 104540292 A | 4/2015 |

(Continued)

OTHER PUBLICATIONS

PCT Search Report dated Sep. 18, 2017.

*Primary Examiner* — Alexander H Taningco
*Assistant Examiner* — Kurtis R Bahr
(74) *Attorney, Agent, or Firm* — Lawrence J. Bassuk; Charles A. Brill; Frank D. Cimino

(57) ABSTRACT

A light emitting diode controller integrated circuit includes counter circuitry having inputs coupled to a clock signal input pin, a pulse width modulated signal input pin, and a sense input pin, and has a count output coupled to a gate drive signal output to an external power transistor. The power transistor is connected in series between a power lead, a sense resistor, and a light emitting diode. The sense input pin is coupled to the series connection between the resistor and the transistor. The counter circuitry provides a Ton_delay equal to a Toff_delay of the power transistor. By counting up during a Ton_delay and down during a Toff_delay, the controller can be used with power transistors of unknown characteristics.

20 Claims, 4 Drawing Sheets

(56) References Cited

U.S. PATENT DOCUMENTS

| | | | |
|---|---|---|---|
| 2006/0214603 A1* | 9/2006 | Oh | H05B 33/0815 315/246 |
| 2007/0263421 A1* | 11/2007 | Kyono | H02M 3/33592 363/127 |
| 2009/0167203 A1* | 7/2009 | Dahlman | H05B 33/0818 315/291 |
| 2010/0156319 A1* | 6/2010 | Melanson | H05B 33/0815 315/297 |
| 2010/0321078 A1* | 12/2010 | Asano | H03K 7/08 327/176 |
| 2011/0194224 A1* | 8/2011 | Schoepke | E05B 47/00 361/170 |
| 2012/0104964 A1* | 5/2012 | Hughes | H05B 33/0815 315/291 |
| 2014/0009077 A1* | 1/2014 | Yoshimoto | H05B 33/0815 315/210 |
| 2017/0085184 A1* | 3/2017 | Lai | H02M 3/33507 |

FOREIGN PATENT DOCUMENTS

| | | | |
|---|---|---|---|
| CN | 105592605 A | 5/2016 | |
| WO | 2014030895 A1 | 2/2014 | |

* cited by examiner

ADAPTIVE TURN-OFF DELAY TIME COMPENSATION FOR LED CONTROLLER

This Application is a Continuation of China PCT Application No. PCT/CN2016/112870, filed Dec. 29, 2017, currently pending.

BACKGROUND OF THE DISCLOSURE

Light emitting diodes (LEDs) emit light when electrical current flows through them and emit no light when no current flows through them. LEDs require control of the current flowing through them to obtain desired brightness. One way of controlling this current flow, and brightness, is by alternately providing current flow through a LED and stopping current flow through the LED in response to a pulse width modulated (PWM) control signal. The percentage of the alternating current flow can be described as a duty cycle of the current flow.

A fifty percent (50%) duty cycle describes a current flow through the LED 50% of the time and no current flow through the LED the other 50% of the time. A 10% duty cycle describes a current flow through the LED 10% of the time and no current flow 90% of the time. A 90% duty cycle describes a current flow through the LED 90% of the time and no current flow 10% of the time. The PWM signal can have a duty cycle to control the current flow and the brightness of the LED.

Although the controlling pulse width modulated signal may have a well-defined 50% duty cycle of on and off times, unequal capacitances in the circuits implementing the flow of current through the LEDs may cause unequal turn on and turn off times of the current, and produce other than a 50% duty cycle of the LEDs.

While some integrated circuit LED controllers contain an integrated power transistor to drive external power to the LEDs, some applications use an integrated circuit to drive an external power transistor to drive external power to the LEDs.

In FIG. 1, circuit 10 provides a series connection between a power lead 12 supplying a voltage such as from a battery, Vbat, and a field ground lead 14 of a current sense resistor 16, a power field effect transistor (FET) 18, and three LEDs 20, 22, and 24. Transistor 18 has a drain 26, a gate 28, and a source 30. Transistor 18 also presents a gate to drain capacitance Cgd 32 and a gate to source capacitance Cgs 34, both indicated in dotted lines.

Integrated circuit controller 36 includes gate driver circuit 38, an Idrive output pin 40, and a PWM input pin 42. The Idrive output pin 40 is connected to the gate 30 of transistor 18 by external lead 41. Gate driver 38 includes switching circuit 44 connected between a power source and a ground and operates under control of a PWM signal received at pin 42 to turn on transistor 18 by sourcing charge to the gate 30 of transistor 18 and to turn off transistor 18 by removing charge from the gate 30. Turning on the transistor 18 conducts a current Iled from the power lead 12 through the resistor 16 and the LEDs 20, 22, and 24 to ground lead 14. Turning off the transistor 18 blocks current from the power lead 12 through the resistor 16 and the LEDs 20, 22, and 24 to ground lead 14.

In some applications, such as an automotive application, the resistor 16, power transistor 18, and LEDs 20, 22, and 24 are separate from the integrated circuit controller 36. In these applications, a problem exists in turning the current Iled through transistor 18 on and off in equal periods of time after state changes in the PWM signals. In large power FET transistors, the capacitances Cgd and Cgs are usually very large.

The current in the power FET transistors depends on the overdrive voltage $V_{OV}$, which is the voltage difference between $V_{GS}$ and transistor GATE-SOURCE threshold voltage $V_{th}$. $V_{OV\_10\%}$ is the overdrive voltage when LED current reaches 10% of full current, $V_{OV\_90\%}$ is the overdrive voltage when LED current reaches 90% of full current, $V_{OV\_FULL}$ is the overdrive voltage when LED has full current. The turn-on delay time Ton_delay depends on the time need to charge the capacitance Cgs from 0V to $V_{th}$+$V_{OV\_10\%}$. The turn-off delay time Toff_delay depends on the time need to discharge the capacitance Cgs from $V_{OV\_FULL}$ to $V_{OV\_90\%}$. Typically the voltage difference between $V_{OV\_FULL}$-$V_{OV\_90\%}$ is much less than the difference between $V_{th}$+$V_{OV\_10\%}$ and 0V. This means that the turn-on delay time Ton_delay and the Toff_delay time of the transistor 18 will be different even with equal Idrive gate currents.

In FIG. 2, PWM signal turns on at time 46 and turns off at time 48. An Idrive current turns on at time 46 and turns off at time 48. Due to the capacitance Cgs 34, the voltage on the gate Vgs increases slowly to turn on the transistor 18 at time 50, effecting a Ton_delay between times 46 and 50. At time 48, the PWM signal turns off and the Idrive signal removes charge from gate 18, to turn off the transistor 18 at time 52, effecting a Toff_delay between times 48 and 52.

A constant current Idrive is used to drive the transistor 18 in order to control the LED current slew rate during a rising and falling phase. For electromagnetic compatibility (EMC) considerations, a low slew rate (1~10 mA/us) of the LED current is preferred. This means that the drive current cannot be very large. This results in the Ton_delay being long due to the limited drive current and a large Cgs of transistor 18 of about several hundred microseconds. The Toff_delay at time is very small, about several microseconds. A big gap between Ton_delay and Toff_delay exists, which causes Iled current duty cycle loss.

BRIEF SUMMARY OF THE DISCLOSURE

A light emitting diode controller integrated circuit comprises detector circuitry having a sense input adapted to be coupled to a sense resistor connected in series with a light emitting diode, a reference voltage input, and a comparator output; compensation timer circuitry having a comparator input connected to the comparator output, an input coupled to a pulse width modulated input signal, a clock signal input, and a count output; driver control circuitry having an input connected to the count output, an input coupled to the pulse width modulated input signal, and a driver output; and driver circuitry having an input connected with the driver output and having a control output signal adapted to be coupled to a control input of a power transistor connected in series with the light emitting diode.

An integrated circuit comprises a clock signal input pin; a pulse width modulated signal input pin; a gate drive signal output pin; and a sense input pin. The integrated circuit is coupled to a series connection between a power lead supplying a voltage and a field ground lead of a sense resistor, a power field effect transistor having a control input, and a light emitting diode. The sense input pin is coupled to the series connection between the resistor and the transistor and the gate drive signal output pin is coupled to the control input of the transistor.

A process of operating a light emitting diode controller comprises incrementing a counter from a start count at a first state change of a pulse width modulated signal; stopping the counter at a stop count upon detecting a current flowing through a power transistor connected in series with a light emitting diode; decrementing the counter from the stop count upon a second state change of the pulse width modulate signal; and stopping the current flow when the counter decrements to the start count.

DETAILED DESCRIPTION OF THE DISCLOSURE

Figure 1:
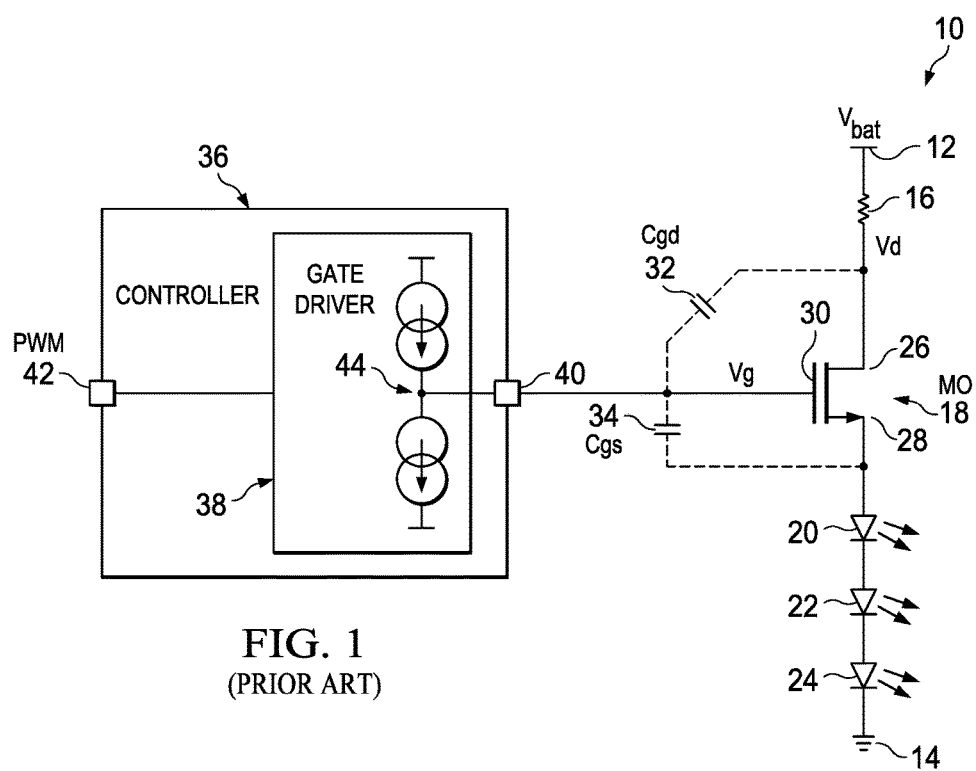
FIG. 1 is a block diagram of a known LED controller circuit.
Figure 2:
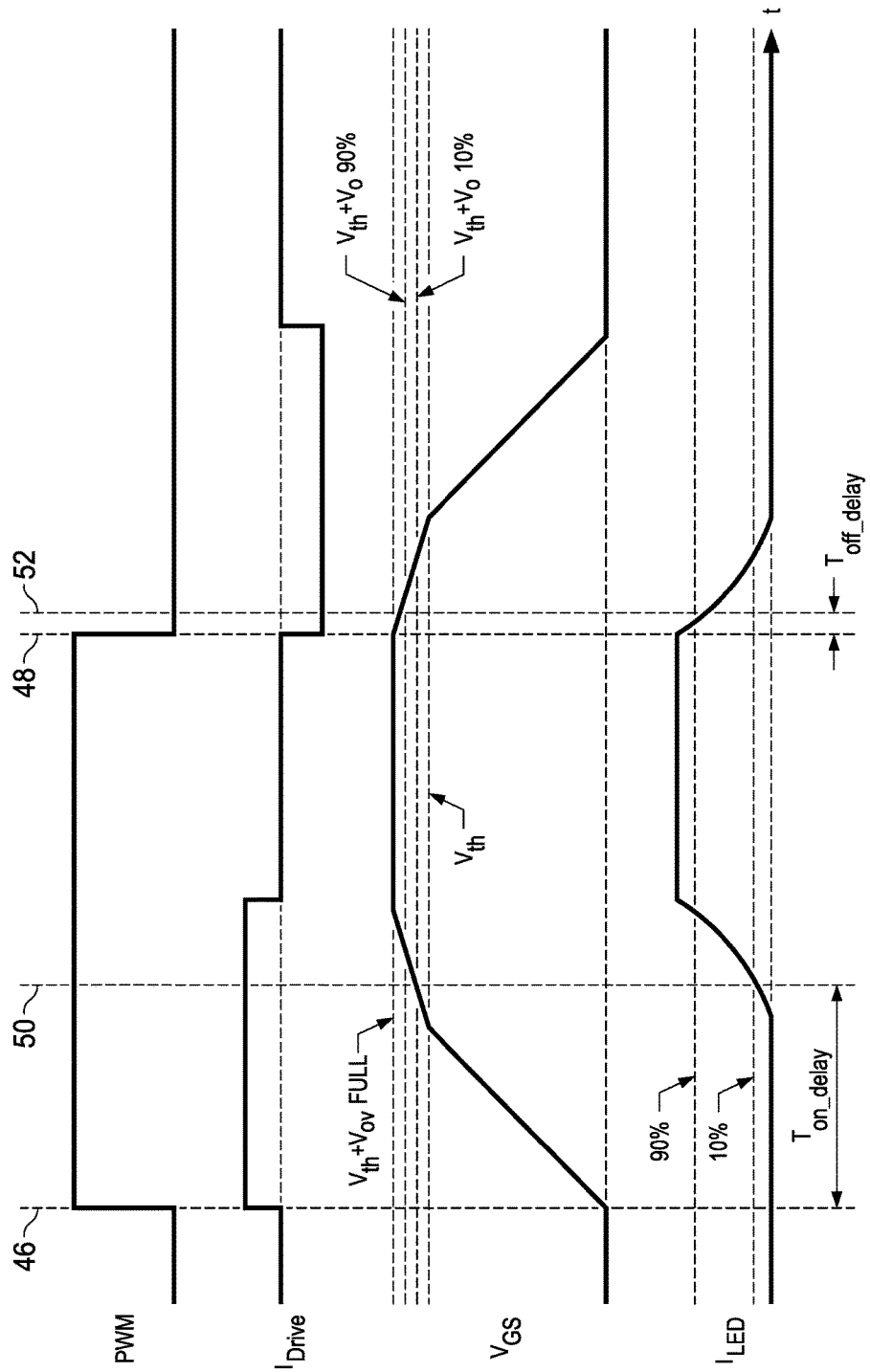
FIG. 2 is a timing diagram of the currents and voltages of the circuit of FIG. 1.
Figure 3:
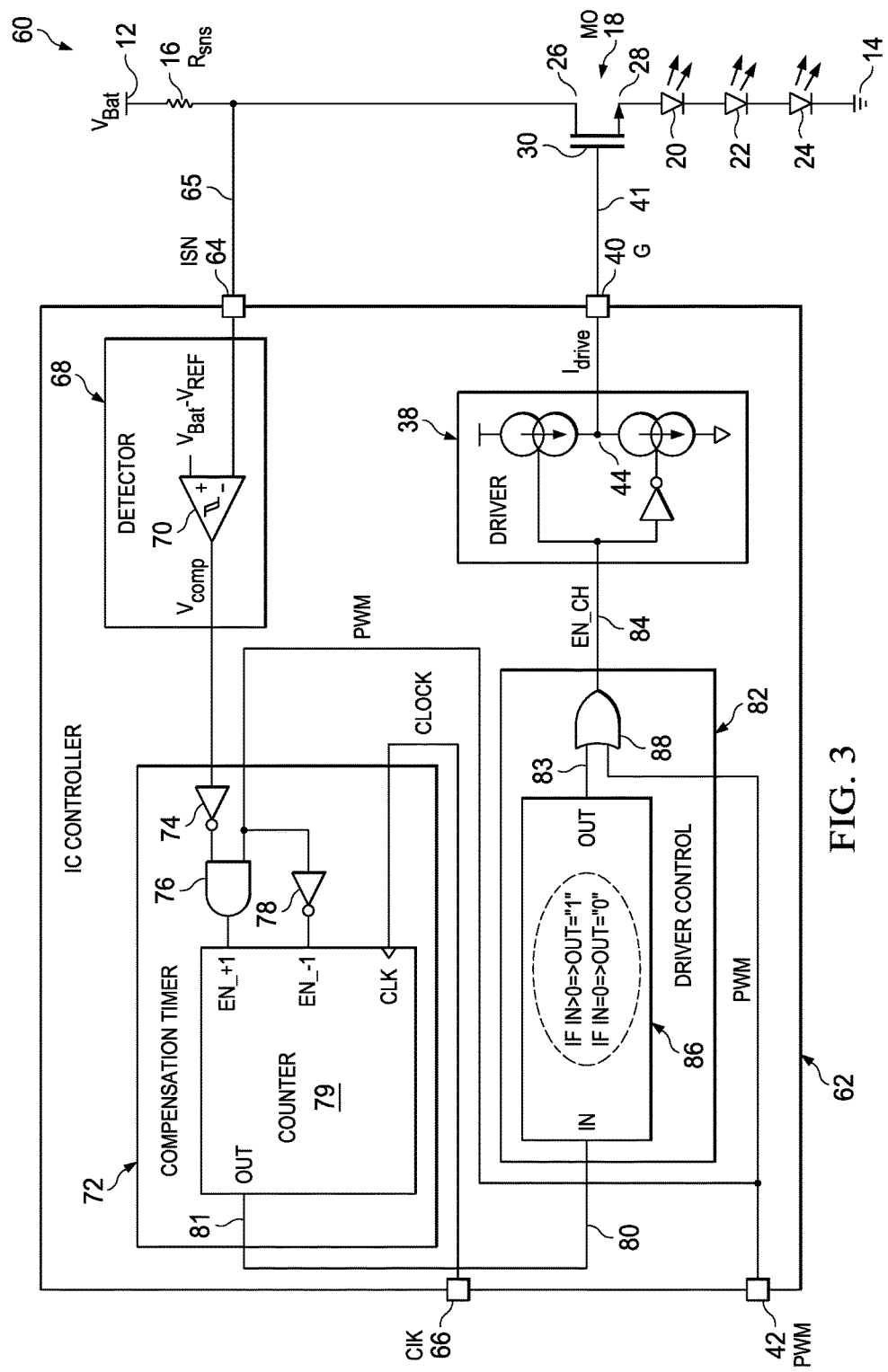
FIG. 3 is a block diagram of a new LED controller circuit.

In FIG. 3, circuit 60 includes the series connection between the power lead 12 and the field ground lead 14 of the current sense resistor 16 acting as a sense resistor Rsns, the power field effect transistor (FET) 18, and the three LEDs 20, 22, and 24. Circuit 60 also includes an integrated circuit controller 62.

Controller 62 has the Idrive or gate output pin 40, the PWM signal input pin 42, an Isn sense input pin 64 connected by an external lead 65 to between the resistor 16 and drain 26 of transistor 18, a clock input pin 66, and switching circuit 44 having an output connected to the Idrive pin 40.

A detector circuit 68 includes a comparator having a non-inverting input connected to a reference voltage Vbat-Vref, an inverting input connected to the Isn sense pin 64, and a Vcomp output.

A compensation timer circuit 72 includes an inverter 74 having an input connected to the Vcomp output of the comparator 70 and an output. An AND gate 76 has an input connected to the output of the inverter, an input connected to the PWM pin 42, and an output. An inverter 78 has an input connected to the PWM pin 42 and an output. A counter 79 has an input connected to the clock pin 66, an enable +1 input connected to the output of the And gate 76, an enable −1 input connected to the output of inverter 78, and a count output 81 providing a count signal on lead 80.

A drive control circuit 82 has an internal logic circuit 86 with an input connected to the count output 81 on lead 80 and an output 83. The logic circuit 86 provides a logic 1 state output signal if the count signal from counter 79 is greater than 0 and provides a logic state output signal if the count signal from counter 79 equals 0. An OR gate 88 has one input connected to the output 83 of the logic circuit 86, an input connected to the PWM pin 42, and an enable channel output on lead 84. Switching circuit 44 in driver circuit 38 has an input connected to lead 84 and an output connected to the gate of transistor 18 through lead 41.

Figure 4:
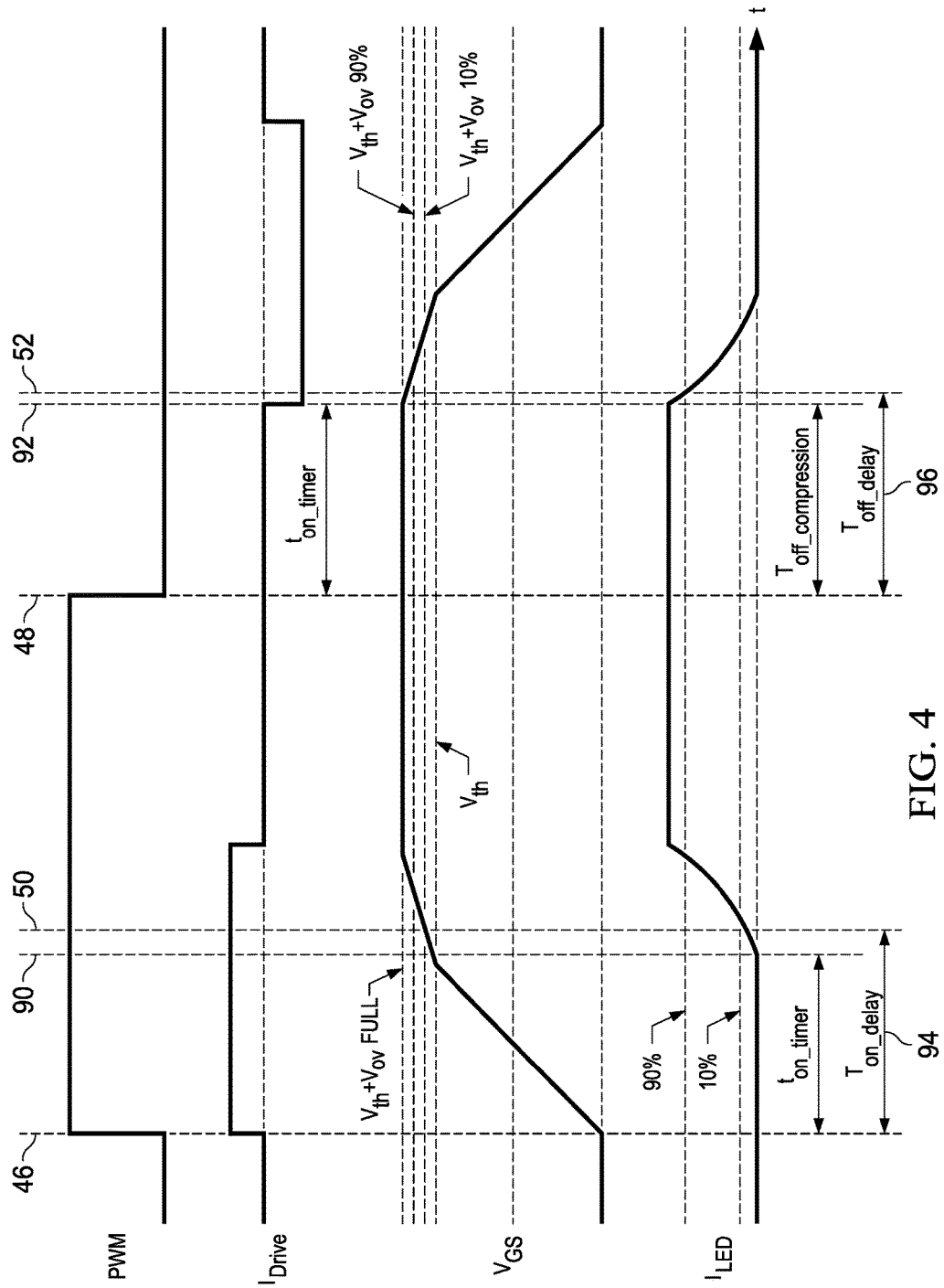
FIG. 4 is a timing diagram of the currents and voltages of the circuit of FIG. 3.

Also referring to FIG. 4, in operation, detector 68 detects any voltage drop on external sense resistor Rsns 16 to monitor the LED current, Iled, passing though transistor 18 to the LEDs 20, 22, and 24. The output of comparator 70, Vcomp, will be a logic 0 at time 46 when voltage Vgs starts to charge the gate of transistor 18 and will be a logic 1 at time 90 when the gate of transistor 18 is fully charged and Iled current starts flowing through the transistor 18.

The counter 79 starts increment counting from a start number at the rising edge of the PWM signal on pin 42 at time 46 and stops counting at a stop number at the rising edge of Vcomp at time 90. The counter 79 starts decrement counting from the stop number at the falling edge of PWM at time 48 and stops counting when it returns to the start number at time 92. In this example, the increment and decrement counting occurs on the rising edges of the clock signal on clock pin 66. The increment and decrement counting provides a Ton_delay time 94 equal to a Toff_delay time 96.

In this example, the start number is zero and the stop number will be determined by the characteristics of the power FET transistor 18. Because the stop count is determined by the characteristics of the external power transistor 18 and not by the characteristics of the controller 62, the characteristics of the integrated circuit controller 62 do not have to be changed for different power transistors. This provides for wide selection of power transistors.

The driver control output on lead 84 is high when the PWM signal goes high and stays high until the counter signal goes to zero. The driver current Idrive charges the gate 30 of the external power transistor 18 when the output on lead 84 is high and discharges the gate 30 when the output on lead 84 is low.

In operation, the disclosed circuits start a timer at a rising edge of the PWM signal and stop the counter when an external power FET is turned on and is detected by a sensing circuit. This records a Ton_delay. The disclosed circuit postpones a falling edge of drive current Idrive by the Ton_delay to compensate for a Toff_delay. With this compensation Ton_delay=Toff_delay, and the current through the LEDs has the same duty cycle as the PWM signal.

As long as the clock signal supplied to the timer is fast enough, the accuracy of LED current duty cycle will be very high. For example, using 2.5 MHz clock signal, the disclosed circuit can achieve +/−0.2% tolerance for LED current duty cycle during 2 KHz, 50% PWM dimming. Again, the disclosed circuit and process is independent on the external FET transistor type. The disclosed circuit and process is suitable for an external FET with different Cgs, Cds and Vth.

Other implementations of the above example are possible based on the disclosed examples. For example, the detector 68 could detect current instead of voltage and could detector a different comparison voltage than Vbat-Vref. The timer 72 could use different gating to turn on and turn off the counter 79. The counter 79 could start counting from any number and could start decrement counting instead of increment counting. The count signal could be binary count signals on parallel leads instead of being one signal on lead 80. The logic circuit 86 could be implemented in any desired gating to attain the desired output signals in response to the count signal or signals. The switching circuit 44 can use desired switches, such as transistors that my contribute their own unequal capacitances to the turn on and turn off times of the power transistor.

The disclosed circuits have used an external power transistor 18 where the characteristics of the external power transistor are unknown to the integrated circuit manufacturer. A like application could be made to an integrated circuit that includes the power transistor, but in that case, the integrated circuit manufacturer would know the characteristics of the power transistor and could design the integrated circuit to provide equal Ton_delay and Toff_delay times with or without the disclosed detector, counter, and driver control circuits.

We claim:
1. A light emitting diode controller integrated circuit comprising:
   (a) detector circuitry having a sense input adapted to be coupled to a sense resistor connected in series with a light emitting diode, a reference voltage input, and a comparator output;
   (b) compensation timer circuitry having an input coupled to the comparator output, a pulse width modulated input, a clock signal input, and a count output, the compensation timer circuitry having an increment input coupled with the comparator input and the pulse width modulated input and a decrement input coupled with the pulse width modulated input;
   (c) driver control circuitry having an input coupled to the count output, an input coupled to the pulse width modulated input, and a driver output; and
   (d) driver circuitry having an input coupled with the driver output and having a control output adapted to be coupled to a control input of a power transistor connected in series with the light emitting diode.

2. The circuit of claim 1 in which the detector circuitry includes comparator circuitry having the sense input, the reference voltage input, and the comparator output.

3. The circuit of claim 1 in which the compensation timer circuitry includes gating circuitry having an input coupled to the comparator input, an input coupled to a pulse width modulated input, an increment count output coupled to the increment input, and a decrement count output coupled to the decrement input.

4. The circuit of claim 1 in which the driver control circuitry includes logic circuitry having the input connected to the count output, the input coupled to the pulse width modulated input signal, and the driver output.

5. The circuit of claim 1 including an integrated circuit carrying the detector circuitry, the compensation timer circuitry, the driver control circuitry, the driver circuitry, a sense input pin adapted to provide the a sense input, a pulse width modulated input pin adapted to provide the a pulse width modulated input signal, a clock pin adapted to provide the clock signal input, and a control pin adapted to provide the control output signal.

6. The circuit of claim 1 including a series connection between a power lead supplying a voltage, the sense resistor, a power field effect transistor having a control input, the light emitting diode, and a field ground, in which the sense input is coupled to the series connection between the resistor and the transistor and the control output is coupled to the control input of the transistor.

7. An integrated circuit comprising:
   (a) a clock signal input pin;
   (b) a pulse width modulated signal input pin;
   (c) a gate drive signal output pin;
   (d) a sense input pin; and
   (e) a compensation timer having an increment input coupled with the sense input pin and the pulse width modulated signal input pin, a decrement input coupled with the pulse width modulated signal input pin, a clock input coupled with the clock signal input pin, and a count output coupled with the gate drive signal output pin.

8. The integrated circuit of claim 7 in which the sense input pin is adapted to be connected to a sense resistor in series with a light emitting diode.

9. The integrated circuit of claim 7 in which the gate drive signal output pin is adapted to be connected to a transistor connected in series with a light emitting diode.

10. The integrated circuit of claim 7 in which the integrated circuit is a light emitting diode controller.

11. The integrated circuit of claim 7 including a series connection between a power lead supplying a voltage and a field ground lead of a sense resistor, a power field effect transistor having a control input, and a light emitting diode, and in which the sense input pin is coupled to the series connection between the resistor and the transistor and the gate drive signal output pin is coupled to the control input of the transistor.

12. The integrated circuit of claim 7 in which the compensation timer includes counter circuitry coupled with the increment input, the decrement input, and the count output.

13. A process of operating a light emitting diode controller comprising:
   (a) incrementing a counter from a start count at a first state change of a pulse width modulated signal;
   (b) stopping the counter at a stop count upon detecting a current flowing through a power transistor connected in series with a light emitting diode;
   (c) decrementing the counter from the stop count upon a second state change of the pulse width modulate signal; and
   (d) stopping the current flow when the counter decrements to the start count.

14. The process of claim 13 in which the detecting includes sensing a voltage in a series connection between a sense resistor and the power transistor.

15. The process of claim 13 including starting to charge a gate of the power transistor at the time of the first state change and maintaining gate charge to a gate of the power transistor at the time of the second state change.

16. The process of claim 13 including maintaining gate charge to a gate of the power transistor at the time of the second state change and starting to remove gate charge from the power transistor when the counter decrements to the start count.

17. The process of claim 13 in which incrementing a counter from a start count includes incrementing the counter from zero.

18. The process of claim 13 in which the stopping the counter at a stop count includes stopping a counter at a time equal to a Ton_delay of the power transistor.

19. The process of claim 13 in which the decrementing the counter from the stop count includes decrementing the counter for a time equal to a Toff_delay of the power transistor.

20. The process of claim 13 in which the stopping the counter at a stop count includes stopping a counter at a time equal to a Ton_delay of the power transistor, and in which the decrementing the counter from the stop count includes decrementing the counter for a time equal to a Toff_delay of the power transistor, where the Ton_delay equals the Toff_delay.

* * * * *